United States Patent [19]

McClung et al.

[11] 3,900,446

[45] Aug. 19, 1975

[54] POLYURETHANE INTERLAYER FOR LAMINATED SAFETY GLASS

[75] Inventors: Charles E. McClung, Kettering; David G. Glasgow, Dayton, both of Ohio

[73] Assignee: Monsanto Company, St. Louis, Mo.

[22] Filed: Sept. 27, 1973

[21] Appl. No.: 401,481

Related U.S. Application Data

[60] Division of Ser. No. 313,492, Dec. 8, 1972, Pat. No. 3,823,060, which is a continuation-in-part of Ser. No. 219,175, Jan. 19, 1972, abandoned, which is a continuation-in-part of Ser. No. 58,731, July 27, 1970, abandoned.

[52] U.S. Cl. ........ 260/75 NT; 161/190; 260/75 NP; 296/84 R
[51] Int. Cl.² ................ C08G 22/06; C08G 22/10; C08G 22/24
[58] Field of Search ... 260/75 NT, 77.5 AT, 75 NK, 260/75 NP

[56] References Cited
UNITED STATES PATENTS

| | | | |
|---|---|---|---|
| 2,929,800 | 3/1960 | Hill | 260/77.5 AM |
| 3,155,724 | 11/1964 | Arthur | 260/563 B |
| 3,523,106 | 8/1970 | Davison | 260/77.5 AT |
| 3,565,768 | 2/1971 | Grant et al. | 260/77.5 AT |
| 3,600,358 | 8/1971 | Taub | 260/75 NT |
| 3,620,905 | 11/1971 | Abramyian | 260/77.5 AT |
| 3,625,921 | 12/1971 | Wooster et al. | 260/77.5 AT |

FOREIGN PATENTS OR APPLICATIONS

| | | |
|---|---|---|
| 785,125 | 12/1972 | Belgium |
| 1,117,629 | 6/1968 | United Kingdom |

OTHER PUBLICATIONS

Vierveg et al. "Polyurethane", Band VII of Kunststoff Handbuch, Hanser Verlag, (Munich) 1966, pages 45–53. Call No. TP1180, P8.

Primary Examiner—H. S. Cockeram

[57] ABSTRACT

Disclosed herein are polyurethane interlayers and laminated glazing units prepared therefrom. The interlayers are prepared from (1) an isomeric mixture of 4,4'-methylene-bis-(cyclohexylisocyanate); (2) a polyester having a melting point above 42°C. which is the condensation product of a dicarboxylic acid and a dihydric compound; and (3) an alpha-, omega-diol containing from 2 to 16 carbon atoms. Laminated safety glass prepared from the foregoing polyurethane interlayer exhibits excellent impact strength over a broad range of temperatures and freedom from discoloration as well as excellent clarity and edge stability.

10 Claims, No Drawings

POLYURETHANE INTERLAYER FOR LAMINATED SAFETY GLASS

CROSS-REFERENCE TO RELATED APPLICATIONS

This application is a division of copending application Ser. No. 313,492, filed Dec. 8, 1972 and now U.S. Pat. No. 3,823,060, which in turn is a continuation-in-part of copending application Ser. No. 219,175, filed Jan. 19, 1972 and now abandoned, which in turn is a continuation-in-part of Ser. No. 58,731, filed July 27, 1970, and now abandoned.

BACKGROUND OF THE INVENTION

1. Field of the Invention

The present invention relates to laminated glazing units. More particularly, the present invention relates to laminated safety glass prepared using a polyurethane interlayer.

2. Description of the Prior Art

Laminated glazing units enjoy widespread applications in vehicles and in architectural uses. Laminated safety glass used as windshields in vehicles must meet several stringent requirements in order to meet minimum safety standards. These requirements include a high degree of clarity or freedom from haze in order to insure maximum light transmission through the laminate. This is necessary in order to insure that the person guiding the vehicle has the maximum visibility possible under the circumstances. Moreover, the interlayer should have a sufficient degree of adhesion to the glass to prevent splinters of glass from flying around the interior of the vehicle in the event that an object strikes the laminate and shatters the glass. A further requirement of the laminate is that it have sufficient impact strength to retain the occupants of the vehicle within the vehicle in the event of a crash. Further in this regard, the laminate should have the capacity of absorbing the shock of impact in the event that an occupant of the vehicle is thrown against the laminate. In addition to the foregoing safety requirements which are of prime importance, the laminate should have sufficient edge stability which would prevent water from penetrating the edges of the laminate causing discoloration or delamination thereby lessening the useful life of the laminate.

The polyurethane interlayers for laminated safety glass, taught in such patents as U.S. Pat. No. 2,333,639; 2,864,780; 3,226,354 and 3,388,032, suffer from one or more drawbacks which make them generally unsuitable for use as the interlayer in laminated windshields for vehicles. For example, interlayers prepared from aromatic diisocyanates such as toluene diisocyanate or 4,4'-methylenebis(phenyl isocyanate) tend to undergo discoloration which precludes their use in automobile windshields. On the other hand, the use of aliphatic diisocyanates such as hexamethylene diisocyanate with a polyester such as polybutylene adipate are characterized by haziness and/or lack of impact strength which makes these materials unacceptable as the interlayer in automobile windshields. The pour-in-place polyurethane interlayers described in Canadian Pat. Nos. 673,674 and 673,678 give rise to additional problems in that the thickness of the pour-in-place film is difficult to control. Furthermore, the epoxy resin used to react with the polyurethane tends to introduce discoloration. In many instances the impact strength of the interlayers of the prior art vary widely. Consequently, many of the known polyurethane interlayers are unsuitable because of the poor impact strength of the resulting laminate and these could not be recommended for windshields even if color, haze and edge stability were not problems.

SUMMARY OF THE PRESENT INVENTION

The foregoing problems which are associated with the polyurethane interlayers of the prior art have been solved by the polyurethane interlayers of the present invention. Laminated glazing units prepared from the polyurethane interlayers of this invention exhibit excellent impact strength over a broad range of temperature, freedom from discoloration, excellent clarity and excellent edge stability. Laminated safety glass prepared from the polyurethane interlayers of the present invention is especially suited for use as windshields in vehicles of all types.

DESCRIPTION OF THE PREFERRED EMBODIMENTS

The polyurethane interlayers of the present invention are prepared from (1) a diisocyanate which is an isomeric mixture of 4,4'-methylenebis(cyclohexylisocyanate) (hereinafter referred to as MBI), (2) a polyester having a melting point above 42°C. which is the condensation reaction product of a dicarboxylic acid and a dihydric compound; and (3) a chain extender which is an alpha, omega-diol which contains from 2 to 16 carbon atoms.

The rigid phase of the glazing unit may be any rigid pellucid material such as glass, polystyrene polyvinyl chloride, polycarbonate, polymethylmethacrylate, ect. The preferred material for automotive glazing units is glass.

The MBI used in the present invention is an isomeric mixture having a trans-trans content of from 0 to 30 percent by weight, a cis-cis content of from 0 to 25 percent by weight and a cis-trans content of from 45 to 90 percent by weight wherein the total amount of isomers is 100% by weight. The preferred isomeric mixture has a trans-trans content of from 15 to 25 percent by weight, a cis-cis content of from 10 to 20 percent by weight and a cis-trans content of from 55 to 75 percent by weight. The most preferred isomeric mixture has a trans-trans content of from 18–22% by weight, a cis-cis content of from 12–18 percent by weight and a cis-trans content of from 60–70 percent by weight.

The polyester component which is reacted with the isomeric mixture of MBI is a condensation reaction product of a dicarboxylic acid containing from 2 to 10 carbon atoms and a dihydric compound containing from 2 to 16 carbon atoms. Examples of suitable dicarboxylic acids used to prepare the polyester include linear aliphatic acid such as oxalic, malonic, succinic, glutaric, adipic, pimelic and subaric, azelaic and sebacic acids. Also contemplated is the use of branched aliphatic diacids such as the alkyl glutaric or adipic acids, wherein the alkyl group contains from 1 to 6 carbon atoms such as for example, 2-methylglutaric, 2,4,4-trimethyladipic, and 3-ethyladipic acid; diacids containing heteroatoms in the main chain or side chain such as oxydiacetic, thiodiacetic, 2-dialkylaminoadipic, 3-methoxyglutaric; alicyclic diacids such as the cyclohexane, cyclopentane and corresponding alkyl substituted dicarboxylic acids; and heterocyclic diacids such as the tetrahydrofuran, tetrahydrothiophene, tetrahydropyrane dicarboxylic acids, etc.

The preferred diacids used in the present invention are the linear aliphatic diacids and in particular glutaric, adipic and azelic acid.

Examples of dihydric compounds which are reacted with the dicarboxylic acid to form the polyester include linear aliphatic alpha-, omega-diols of from 2 to 10 carbon atoms such as ethylene glycol, 1,3-propane glycol, 1,4-butane glycol, 1,5-pentane glycol, 1,6-hexane glycol, 1,7-heptane glycol, 1,8-octane diol, 1,10-decane diol, etc. Also contemplated is the use of branched aliphatic glycols such as 1,2-propanediol, 2,3-butanediol, 2,2-dimethylpropanediol, 3-methyl-1,5-pentanediol, phenyl-1,2-ethanediol, 2,4,4-trimethylhexanediol, 3-methoxypentanediol; alicyclic diols such as the cyclohexanediols, cyclopentanediols, cyclohexanedimethanols, decahydronaphthalenediols, 2,2-bis(4-hydroxycyclohexyl)propane; heterocyclic glycols such as the tetrahydrofurandiols, tetrahydropyrandiols, N-hydroxyethyl-4-propanolpiperidine, 1,2-bis[N-(2-hydroxyethyl)4-piperidyl]ethane; and other glycols such as the ethoxylated or propoxylated dihydroxy compounds such as bisphenol A, hydrogenated bisphenol A, cyclohexanediol.

The preferred glycols for use in the present invention are the aliphatic alpha, omega-diols and in particular ethylene glycol, 1,4-butane glycol and 2,2-dimethylpropanediol.

The polyester is prepared according to any of those methods which are well known in the art. The polyesters used in the present invention are those having a melting point above 42°C. and preferably above 45°C. Preferably, the polyester has an average molecular weight in the range of from 500 to 4000 and more preferably in the range of from 800 to 1200. The reaction of the aliphatic diacid and the aliphatic dihydric compound should be carried out in such a manner so as to provide terminal hydroxyl groups on the polyester. Moreover, in choosing the diacid and glycol components used to prepare the polyester, care should be taken so as to provide a resulting polyester with a molecular weight of from 500 to 4000 and a melting point above 42°C. Such a selection process is well known to those skilled in the art.

The third component used to prepare the polyurethane interlayers of the present invention is a chain extender which is an alpha-omega-diol containing from 2 to 16 carbon atoms. Examples of these diols would include linear aliphatic alpha-, omega-diols of from 2 to 6 carbon atoms such as 1,2-ethylene glycol, 1,3-propane diol, 1,4-butane diol, 1,5-pentane diol, 1,6-hexane diol.

Also contemplated in the use of branched aliphatic glycols such as 1,2-propanediol, 2,3-butanediol, 2,2-dimethylpropanediol, 3-methyl-1,5-pentanediol, phenyl-1,2-ethanediol, 2,4,4-trimethylhexanediol, 3-methoxypentanediol, etc.; alicyclic diols such as the cyclohexanediols, cyclopentanediols, cyclohexanedimethanols, decahydronaphthalenediols, 2,2-bis(4-hydroxycyclohexyl) propane, etc.; and diols such as the ethoxylated or propoxylated dihydroxy compounds e.g. bisphenol A, hydrogenated bisphenol A, cyclohexanediol, etc. Small amounts of water may be used in combination with the foregoing chain extenders. The use of corresponding thiols is also contemplated.

The preferred chain extenders are the linear aliphatic alpha-, omega- diols and in particular 1,3-propanediol, 1,4-butanediol and 1,5-pentanediol. Especially preferred for use in this invention are 1,3-propane diol and 1,5-pentane diol because of the excellent edge stability and clarity that they impart to laminates.

The polyurethane interlayers are prepared by reacting the diisocyanate, polyester and alpha-, omega-diol chain extender according to the conventional methods of the prior art. The particular methods used in the working examples of the present specification are explained in greater detail below.

In the working examples set forth below the polyurethane materials of the present invention are conveniently prepared by a one step or two step technique. In the one step method the alpha-, omega-diol chain extender and degassed polyester are charged to a dried four-necked flask fitted with mechanical stirrer, thermometer and dry nitrogen inlet and cooled to 20° to 50°C. The diisocyanate is added, the mixture degassed and then cooled to about 40°C. as long as no crystallization occurs. The catalyst is then added and stirred in for one minute at which time degassing is begun again. Degassing is continued for four minutes if possible. After degassing the stirring is continued for another two minutes, if possible. If at any time during this procedure the temperature reaches 70°C. or the rate of temperature increase exceeds 10°C./minute, the reaction mixture is immediately cast into a mold. Reaction conditions from 80° to 100°C. for times in the range of 2 to 144 hours are used to cure the polymer.

The two step method involves (a) prepolymer preparation and (b) polymer preparation. In the prepolymer preparation the diisocyanate is placed in a dried four-necked flask fitted with a mechanical stirrer, thermometer, dropping funnel, and dry nitrogen inlet. The polyester which has been degassed and stripped of volatiles up to 95°C. and 0.5 mm Hg, is added through a dropping funnel. The reaction temperature is held at 80°-85°C. by heating, cooling, and/or adjusting the rate of addition of the polyester. Heating is continued for five hours after any exotherm has ceased. During the last half hour the prepolymer is degassed at 1–5 mm Hg.

Immediately after degassing the prepolymer prepared as above, a sample is taken and the percent isocyanate (and consequently the equivalent weight) is determined as per ASTM D1638–61T. The calculated amount of alpha-, omega-diol chain extruder is then added to the prepolymer held at 45°–50°C. This temperature is necessary to obtain the viscosity required for adequate mixing. The reaction is stirred for 30 minutes while degassing and then a calculated amount of catalyst is added and degassing is continued. The reaction is stirred as long as the rate of temperature increase does not exceed 10°C./minute or the temperature does not exceed 70°C. Once stirring and degassing has to be stopped the reaction mixture is immediately cast into a mold. Cure cycles are as described above.

The equivalent ratio of diisocyanate/polyester/chain extender in the polyurethane interlayers of the present invention is in the range of from 1.5/1.0/0.5 to 4/1.0/3. More preferably, the equivalent ratio of diisocyanate/polyester/chain extender is in the range of from 2.0/1.0/0.94 to 2.3/1.0/1.23.

The thickness of the interlayer prepared from the polyurethane prepared above can be adjusted by controlling the depth of the mold. Alternately, a large polyurethane cake can be prepared and interlayers of appropriate thickness obtained from the sheet by skiving. In still other methods, the interlayer is obtained by a continuous casting technique or by continuous reaction of the raw materials in an extruder to form a continuous sheet of material. Other conventional sheet extrusion methods can also be used.

The thickness of the polyurethane interlayers of the present invention may vary over a wide range. Preferably, the interlayer has a thickness of from 0.002 inch (2 mils) to 0.120 inch (120 mils). More preferably, the interlayers of the present invention have a thickness of from 10 to 45 mils. Prior to preparing the laminate, the interlayer is conditioned to the desired moisture content, usually 0.05 to 1.0 percent by weight. In the Examples set forth below sets of glass laminates are individually prepared by interposing an interlayer approximately 30 mils thick between two - 12 × 12 × 0.125 inch panels of glass. These assemblies are then subjected to a temperatures from 275°F. to 350°F. and pressure from 60 to 300 psi for 10 to 15 minutes to form the laminated safety glass. These laminates are then subjected to Mean Break Height tests according to the recently established tentative specifications set up by the Society of Automotive Engineers, the Subcommitee on Automotive Glazing.

In essence, the Mean Brak Height test comprises placing the laminate in a horizontal position with a frame or edge support and allowing a five (5) pound steel ball to drop from a designated height against approximately the middle of the laminate. This test is repeated at increasing ball-drop heights to determine the approximate height in feet at which 50 percent of the laminates tested will resist penetration. In other words, the Mean Break Height of a laminate is a measure of the ability of that laminate to absorb the energy of an impacting object.

The edge stability of the laminates is tested according to test method ASA 5.3.2 except that a 3 × 5 inches laminate is used instead of the 12 × 12 inches laminate outlined in ASA 5.3.2. and the laminates are checked after two (2) and four (4) week intervals instead of the two weeks outlined in ASA 5.3.2. This test is described in "American Safety Code for Safety Glazing Materials for Glazing Motor Vehicles Operating on Land Highways." publication no. Z26.1 – 1966 of the American Standards Association.

The following examples are set forth in illustration of the present invention and should not be construed as a limitation thereof. All parts and percentages given are by weight unless otherwise indicated.

EXAMPLES 1 TO 5

The following examples illustrate the preferred embodiments of the present invention. In these Examples the diisocyanate used is an isomeric mixture of 4,4'-methylenebis(cyclohexylisocyanate) having a trans-trans content in the range of from 15 to 25 percent; a cis-cis content in the range of from 10 to 20 percent; and a cis-trans content in the range of from 55 to 75 percent by weight. This material is commercially available as Hylene W (a trademark of duPont). The Poly(1,4-butylene adipate) melts at 49.0 to 50.0°C. In Examples 1, 2 and 5, 1,4-butane diol is used as the chain extender while 1,3-propane diol is used as the chain extender in Examples 3 and 4. In Examples 1 to 4 the polymer is prepared in a one step process using 0.0125 percent by weight of a dibutyltin diacetate catalyst. Example 5, which is essentially the same as Example 2, is prepared by a two step method using 0.025 percent of a dibutyltin diacetate catalyst. The results of these examples are summarized in Table 1 below.

TABLE I

SUMMARY OF EXAMPLES 1 to 5

| Ex. | Polyester Mol. Wt. | Polymer Composition NCO:GLYCOL: CE (1) | Reaction Conditions Temp. °C. | Time Hrs. | $n_r$ (2) | Laminate Mean Break Height (feet)(3) | | | Relative Haze (4) |
|---|---|---|---|---|---|---|---|---|---|
| | | | | | | 0°F. | 70°F. | 120°F. | |
| 1 | 1007 | 2.2:1.0:1.14 | 90 | 96 | 2.44 | 21 | 31 | 19 | <1.0 |
| 2 | 1024 | 2:1:0.94 | 90 | 96 | 3.29 | >42 | 36 | 14 | 0.83 |
| 3 | 1007 | 2.3:1.0:1.23 | 90 | 96 | 2.97 | 25 | 27 | 13 | <1.0 |
| 4 | 1024 | 2:1:0.94 | 90 | 96 | 3.32 | 30 | 23 | 6.5 | 0.37 |
| 5 | 1024 | 2:1:1.00 | 80 | 96 | 3.24 | 35 | 35 | 14 | <1.0 |

(1) Ratio of diisocyanate:polyester:chain extender.
(2) Relative viscosity determined at 30°C. using a 1.0% solution in dimethylacetamide.
(3) Based on approximately 30 mil interlayers.
(4) Relative to the conventional plasticized polyvinyl butyral glass laminate standard described above.

The laminates are tested for haziness according to ASTM Test D-1003-61 and for relative haze by comparing test laminates with a known standard under ultraviolet light. The standard used is a conventional plasticized polyvinyl butyral glass laminate of the type used in automobile windshields. The standard interlayer used is a 30 mil sheet of polyvinyl butyral plasticized with 42 parts, per hundred parts of resin, of triethylene glycol di(2-ethyl butyrate). The resin is characterized as having a hydroxyl content of 19.5 percent, a residual acetate content of 1.0 percent and a butyral content of 79.5 percent. The glass used is polished plate glass having a thickness of 0.125 inch. The standard is given a relative value of one (1). The numerical values listed below are from the ASTM test.

The data in the foregoing Table 1 clearly illustrate the superior polyurethane interlayers and glass laminates prepared therefrom which are obtained according to the practice of the present invention. Examples 1 and 2 illustrate that a variation in the proportion of reactants results in a variation of the Mean Break Height. Thus, a much flatter Mean Break Height Curve when plotting Mean Break Height versus Temperature can be obtained by a judicious selection of the proportion of reactants. This means a safer windshield can be provided over a broad temperature range which is a significant and important contribution to the glass laminate art and to the safety of motorists. Examples 3 and 4 further illustrate that the Mean Break Height can be regulated by a judicious selection of reactants and the proportions thereof. In Example 3 the amount of diisocyanate and chain extender is increased over that amount used in Example 4. As a result the Mean Break Height tests for Example 3 show a decrease in the 0°F. Mean Break Heights and a corresponding increase in the 120°F. Mean Break Heights as compared to Example 4. This results in a flatter impact curve over a broad temperature range as compared to Example 4.

Note that all the laminates prepared in accordance with the present invention have a very low relative haze value. This indication of clarity and light transmission clearly shows the suitability of these materials for use in glazing units, especially windshields, used in vehicles.

EXAMPLES 6 TO 9 (CONTROL)

The following examples are set forth to illustrate the unacceptable level of haze that is obtained when using a blend of two different isomeric mixtures of 4,4'-methylenebis(cyclohexylisocyanate) wherein one component of the blend has an isomeric content outside of the above prescribed range. The general one step procedures of Examples 3 and 4 are used here to prepare the polymer using poly(1,4-butylene adipate) (M.P. = 49° to 50°C.) and 1,3-propanediol as the chain extender. The 4,4'-methylenebis(cyclohexylisocyanate) used is a blend of (1) a commercially available composition - Hylene W (available from duPont); and (2) a commercially available composition - Nacconate H-12 (available from Allied Chemical). The Hylene W used in Example 6 has a trans-trans content of about 21 percent, a cis-cis content of about 15 percent, and a cis-trans content of about 64 percent by weight. The Hylene W used in Examples 7 and 8 has a trans-trans content of about 20 percent, a cis-cis content of about 17 percent and a cis-trans content of about 62 percent by weight. The Nacconate H-12 has a trans-trans content of about 49 percent, a cis-cis content of about 9 percent and a cis-trans content of about 42% by weight.

In Examples 6 to 8 the poly(1,4-butylene adipate) used has a molecular weight of 1007 while in Example 9 its molecular weight is 1024. In each example the ratio of isocyanate:poly(1,4-butylene adipate):1,3-propanediol is 2:1:0.94. The curing conditions for the polymers in Examples 6 to 9 are 96 hours at 90°C.

TABLE II

SUMMARY OF CONTROL EXAMPLES 6 to 9

| Ex. | Ratio Used Hylene W | Nacconate H-12 | % Trans-Trans Isomer | % Cis-Cis Isomer | % Cis-Trans Isomer | Relative Haze (1) |
|---|---|---|---|---|---|---|
| 6 | 9 | 1 | 23.5 | 14.5 | 62 | 15.25 |
| 7 | 7.5 | 2.5 | 27.6 | 15.2 | 57.2 | 5.60 |
| 8 | 5 | 5 | 34.8 | 13 | 52.2 | 16.05 |
| 9 | 0 | 10 | 49.2 | 8.8 | 42 | Hazy |

(1) Relative to the conventional plasticized polyvinyl butyral glass laminate standard described above.

A comparison of Examples 6 to 9 with Examples 1 to 5 clearly shows the superior clarity that is obtained when using only a 4,4'-methylenebis(cyclohexylisocyanate) having an isomeric content within the specific range. Note that the haze level of the laminates of Examples 6 to 8, wherein a blend of two different isomeric mixtures is used, is much greater than that obtained in Examples 1 to 5. Note further that Example 9, which uses a commercially available mixture of isomers which are outside the specified ranges, also exhibits undesirable haze. The level of haze obtained in Examples 6 to 9 makes these laminates unacceptable for use as the windshield in vehicles where optical qualities must be of the highest order.

EXAMPLES 10 to 21

Examples 10 TO 21 are set forth to illustrate some of the variation in reactants and proportion of reactants that are possible in the practice of the present invention.

Examples 10 and 18 to 21 are prepared using the one step procedure described above while Examples 11 to 17 are prepared using the two step procedure.

Examples 14 to 16 are prepared using an acetic acid catalyst while the others use dibutyltin diacetate as the catalyst. In each example the diisocyanate used is the 4,4'-methylenebis(cyclohexyl diisocyanate) used in Examples The poly(ethylene adipate) (PEA) used in Examples 10 to 16 has a melting point of 49° to 50°C. while that used in Example 17 has a melting point of 53° to 55°C. The poly(1,4-butylene adipate) (PBA) used in Examples 18 to 21 has a melting point of 49° to 50°C. A summary of these examples is reported in the following Table III.

TABLE III

SUMMARY OF EXAMPLES 10 to 21

| Ex. | Polyester (4) Composition | Mol.Wt. | Chain Extender (5) | NCO:GLYCOL: CE (1) | Reaction Conditions Temp. °C. | Time Hrs. | $n_r$ (2) | Relative Haze (3) |
|---|---|---|---|---|---|---|---|---|
| 10 | PEA | 1026 | 1,2-ED | 2:1:0.94 | 90 | 96 | 1.89 | Clear |
| 11 | " | 1019 | 1,3-PD | 2:1:0.95 | 80 | 96 | 3.83 | 0.62 |
| 12 | " | " | 1,4-BD | 2:1:0.95 | 80 | 96 | 3.42 | 0.62 |
| 13 | " | " | 1,3-PD | 2:1:0.95 | 80 | 96 | 3.41 | 0.36 |
| 14 | " | " | 1,3-PD | 2:1:0.95 | 80 100 | 96 48 | 2.44 | Clear |
| 15 | " | " | 1,3-PD | 2:1:0.95 | 80 100 | 96 48 | 2.70 | Clear |
| 16 | " | " | 1,3-PD | 2:1:0.95 | 80 100 | 96 48 | 1.62 | Clear |
| 17 | " | 2017 | 1,3-PD | 2:1:0.95 | 80 | 96 | 2.79 | Clear |

TABLE III—Continued

SUMMARY OF EXAMPLES 10 to 21

| Ex. | Polyester (4) Composition | Mol.Wt. | Polymer Composition Chain Extender (5) | NCO:GLYCOL: CE (1) | Reaction Conditions Temp. °C. | Time Hrs. | $n_r$ (2) | Relative Haze (3) |
|---|---|---|---|---|---|---|---|---|
| 18 | PBA | 1010 | 1,3-PD | 3:1:1.90 | 80 | 96 | 2.24 | 0.48 |
| 19 | " | 1010 | 1,3-PD | 3:1:1.95 | 90 | 96 | 1.57 | Clear |
| 20 | " | 1007 | 1,3-PD | 3:1:1.91 | 90 | 96 | — | Clear |
| 21 | " | 1010 | (1,3-PD *-(1,4-BD | 3:1:1.91 | 90 | 96 | 1.62 | Clear |

(1) Ratio of diisocyanate:polyester:chain extender.
(2) Relative viscosity determined at 30°C. using a 1.0% solution in dimethylacetamide.
(3) Relative to the conventional plasticized polyvinyl butyral glass laminate standard described above.
(4) PEA — poly(ethylene adipate) PBA — poly(1,4-butylene adipate)
(5) 1,2-ED — 1,2-ethane diol 1,3-PD — 1,3-propane diol 1,4-BD — 1,4-butane diol
* 1/1 ratio Examples 10 to 17 illustrate the use of poly(ethylene adipate) as the polyester with Example 17 using a higher molecular weight material. Example 10 uses 1,2-ethane diol as the chain extender while Example 21 uses a 1:1 mixture of 1,3-propane diol and 1,4-butane diol. Examples 18 to 21 also illustrate a higher ratio of diisocyanate in the polymer composition. Note the excellent clarity in all of the above compositions.

EXAMPLES 22 TO 36 (CONTROL)

These examples illustrate the use of other well known diisocyanates in the preparation of the polyurethane materials of the prior art. Poly(ethylene adipate) (Examples 35 to 36) and poly(1,4-butylene adipate) (Examples 22 to 34) are used as the polyester reactant and 1,3-propane diol and 1,4-butane diol as the chain extenders. The polyurethane is prepared according to the methods outlined above. Examples 23 and 27 are prepared via the one step method while in the other examples the two step method is used. In each example the resultant polyurethane is unacceptable for use as the interlayer material in vehicle windshields because of poor optical properties. The poly(ethylene adipate) used in Examples 35 and 36 and the poly(1,4-butylene adipate) used in Examples 22, 23, 29, 30 and 31 have a melting point of 49° to 50°C. The poly(1,4-butylene adipate) used in Examples 24 to 28 and 32 to 34 has a melting point of 54° to 56°C. Results of these examples are summarized in the following Table IV.

The data in the foregoing Table IV illustrate the poor optical properties which are obtained in polyurethane interlayers when using diisocyanates other than the isomeric mixture of the 4,4'-methylenebis(cyclohexyl isocyanate) used in the present invention. Aromatic diisocyanates such as those used in Examples 22 to 28 give polyurethanes which are characterized by having exceptionally poor optical properties. The polyurethanes prepared in Examples 29 to 36, using hexamethylene diisocyanates also exhibit a degree of haziness which makes them unacceptable for use as the interlayer in laminates designed for use in vehicles. The data in Table IV are of further interest in view of the fact that 4,4'-methylenebis(phenylisocyanate) has a structure which is very analagous to the 4,4'-methylenebis(cyclohexyl isocyanate) used in the present invention. However, despite the very close chemical structure, the phenyl isocyanate fails to give polyurethane with the unique properties found in those materials prepared in accordance with the teachings of the present invention.

EXAMPLES 37 TO 38 (CONTROL)

Examples 37 and 38 illustrate the use of polyoxytetramethylene glycol in place of the polyester component specified for use in the present invention. In each example, the one step method described above is used to prepare the polyurethane. Glycols with molecular

TABLE IV

SUMMARY OF CONTROL EXAMPLES 22 to 36

| Ex. | Polyester Mol. Wt. | Polymer Composition Isocyanate (4) | Chain Extenders (5) | NCO:POLY-ESTER:CE (1) | Reaction Conditions Temp. °C. | Time Hrs. | $n_r$ (2) | Relative Haze (3) |
|---|---|---|---|---|---|---|---|---|
| 22 | 1011 | XDI | BD | 2:1:0.95 | 90 | 24 | 2.50 | 11.65 |
| 23 | " | " | " | 2:1:1.00 | 90 | 24 | 1.39 | Hazy |
| 24 | 1956 | MDI | " | 2:1:0.95 | 90 | 24 | — | Opaque |
| 25 | " | " | " | 3:1:1.95 | 90 | 24 | — | " |
| 26 | " | " | " | 4:1:2.95 | 90 | 24 | — | " |
| 27 | " | " | " | 2:1:0.95 | 90 | 24 | — | " |
| 28 | 2000 | " | " | 2:1:0.95 | 80 | 24 | — | " |
| 29 | 1011 | HMD | " | 2:1:0.95 | 80 | 24 | — | Hazy |
| 30 | 1020 | " | PD | 3:1:1.95 | 100 | 48 | — | " |
| 31 | 1010 | " | " | 3:1:1.85 | 80 | 72 | — | " |
| 32 | 2000 | " | " | 2:1:0.95 | 90 | 24 | — | " |
| 33 | " | " | BD | 2:1:0.95 | 90 | 24 | — | " |
| 34 | " | " | PD | 2:1:0.95 | 100 | 24 | — | " |
| 35 | 1023 | " | " | 2:1:0.95 | 90 | 24 | — | " |
| 36 | " | " | BD | 2:1:0.95 | 90 | 24 | — | " |

(1) Ratio of diisocyanate:polyester:chain extender.
(2) Relative viscosity determined at 30°C. using a 1.0% solution in dimethylacetamide.
(3) Relative to the conventional plasticized polyvinyl butyral glass laminate standard described above.
(4) XDI — xylene diisocyanate. MDI — 4,4'-methylenebis(phenyl isocyanate) HMD — hexamethylene diisocyanate
(5) BD — 1,4-butane diol PD — 1,3-propane diol weights of 670 and 1030 are used in Examples 37 and 38, respectively. In each example the diisocyanate used is the isomeric mixture used in Examples 1 to 5, and 1,3-propane diol is used as the chain extender. The test results on these examples are tabulated in the following Table V.

prepared using hexamethylene diisocyanate. Examples 50 to 51 use 4,4'-methylenebis(phenyl isocyanate). All of the polyesters used have melting points in the range of from 48° to 55°C.

A summary of these examples appears in the following Table VI.

TABLE VI

SUMMARY OF EXAMPLES 39 to 51

| Ex. | Polyester or Glycol (4) | Polymer Composition Mol. Wt. | Chain Extender (5) | NCO:GLYCOL: CE (1) | Reaction Conditions Temp. °C. | Time Hrs. | $n_r$ (2) | Laminate Mean Break Height (feet) (3) 0°F. | 70°F. | 120°F. |
|---|---|---|---|---|---|---|---|---|---|---|
| 39 | PBA | 1020 | BD | 2:1:1.00 | 80 | 96 | 1.82 | 13 | 23 | 13 |
| 40 | " | " | " | 2:1:0.95 | 80 | 72 | 3.15 | 11 | 30.5 | 11 |
| 41 | PEA | 2017 | PD | 3:1:1.91 | 90 | 96 | 2.66 | 26.5 | 19.5 | 9 |
| 42 | " | " | " | 3:1:1.91 | 90 | 96 | 3.38 | 24 | 21 | 9 |
| 43 Control | " | 1927 | BD | 2:1:0.95 | 80 100 | 22 2 | — | 20 | 10 | 8 |
| 44 Control | " | " | " | 2:1:0.95 | 80 100 | 22 2 | — | | 8 | |
| 45 Control | PBA | 1020 | PD | 2:1:0.95 | 80 | 84 | 2.84 8% gel | 22 | 11 | 8 |
| 46 Control | $(C_4O)_x$ | 670 | " | 2:1:0.95 | 80 | 48 | 1.81 | | 8 | |
| 47 Control | " | " | " | 2:1:0.95 | 80 | 96 | 2.77 | | 8 | |
| 48 Control | " | " | " | 2:1:0.95 | 80 100 | 48 24 | 1.77 46% gel | | 10 | |
| 49 Control | " | 1030 | BD | 2:1:0.95 | 80 100 | 22 2 | — | | | |
| 50 Control | PBA | 2000 | " | 3:1:1.95 | 80 | 24 | — | | 13 | |
| 51 Control | " | " | " | 3:1:1.95 | 80 | 24 | 2.25 | | 15 | |

(1) Ratio of diisocyanate:polyester:chain extender.
(2) Relative viscosity determined at 30°C. using a 1.0% solution in dimethylacetamide.
(3) Based on approximately 30 mil interlayers.
(4) PEA — poly(ethylene adipate) PBA — poly(1,4-butylene adipate) $(C_4O)_x$ — polyoxytetramethylene glycol
(5) BD — 1,4-butane diol PD — 1,3-propane diol

TABLE V

SUMMARY OF CONTROL EXAMPLES 37 and 38

| Ex. | Polymer Composition NCO:GLYCOL: CE | Reaction Conditions Temp. °C. | Time Hrs. | $n_r$ | Relative Haze |
|---|---|---|---|---|---|
| 37 | 3:1:1.90 | 80 | 144 | 1.39 | Hazy |
| 38 | 3:1:2.0 | 80 | 96 | 2.08 | 4.00 |

Note that the substitution of polyoxytetramethylene glycol for the preferred polyesters results in a polyurethane which gives an unacceptable haze level in the laminate. Other samples were prepared using polyoxytetramethylene glycol having a molecular weight of 670, wherein the ratio of diisocyanate:glycol:chain extender was 2:1:0.95. These materials exhibited much better clarity than those prepared in Examples 37 and 38. However, the tear impact strengths of these materials were in the range of from 62 to 70 ft. - lbs./in. experience has shown that polyurethane interlayer materials with such a low degree of tear strength result in glass laminates with a low degree of impact strength.

EXAMPLES 39 TO 51

The following Examples 39 to 51 are set forth to illustrate the superior impact strength that is obtained with the interlayer materials of the present invention. Also included for comparison are interlayer materials prepared from diisocyanates other than the preferred isomeric mixture of 4,4'-methylenebis(cyclohexyl isocyanate). The polyurethane materials are prepared according to the procedures outlined above. In Examples 41, 42 and 51 the one step process is used while the other examples are prepared using the two step process. Examples 39 to 42 are prepared using the isomeric mixture of 4,4'-methylenebis(cyclohexyl isocyanate) used in Examples 1 to 5. Examples 43 to 49 are Note in the foregoing Table VI that the laminates prepared according to the teaching of the present invention (Examples 39 to 42) exhibit superior impact strength as measured by the Mean Break Height than the laminates prepared from polyurethane interlayers of the prior art (Examples 43 to 51). Note also that the laminates prepared according to the present invention exhibit a Mean Break Height which would give a flatter curve when plotting Mean Break Height vs. temperature than those laminates prepared according to the teachings of the prior art. In some cases, especially in Examples 44 and 46 to 51, the Mean Break Height at 70°F. coupled with the poor optical clarity of the laminates prepared using the polyurethane interlayers of the prior art did not warrant further testing.

EXAMPLE 52

This example is set forth to illustrate the printability of the polyurethane interlayers of this invention so as to provide a colored gradient in the resulting laminate.

The interlayer material prepared in Example 1 is printed with an ink comprising anthraquinone dyes dissolved in a solvent which contains N,N-dimethylformamide. The sheet is dried and then laminated between glass sheets in a conventional manner. The resulting laminate is characterized by having a blue colored gradient similar to that found in conventional windshields.

Accelerated edge stability tests are conducted in order to measure the ability of the laminate to resist delamination under conditions of high humidity. This is an index to the long term stability of the laminate and is useful in predicting whether or not a given laminate is suitable for use as a vehicle windshield.

The test laminates used are prepared from the interlayers described in Examples 3, 4 and 45 above. A commercially available polyurethane material "TEXIN 480" (a product of Mobay Chemical Company) is also included. This latter polyurethane material is believed to be based on 4,4'-methylenebis(phenyl isocyanate). The results of the edge stability test are reported in the following Table VII.

TABLE VII

EDGE STABILITY TEST RESULTS

| Example | Two (2) Week Test | Four (4) Week Test |
|---------|-------------------|--------------------|
| 3 | Pass | Pass |
| 4 | Pass | Pass |
| 45 | Fail | — |
| Texin 480 | Fail | — |

Note in Table VII above, that the interlayers of Examples 3 and 4, which are prepared according to the teachings of the present invention, exhibit excellent edge stability even after a four week test period. On the other hand, the interlayer prepared in Example 45 using hexamethylene diisocyanate fails to pass the two week period. The commercial material which is believed to be based on 4,4'-methylenebis(phenyl isocyanate) also fails to pass the two week test period. These results, along with the other test results listed above, indicate the clear superiority of the interlayers of the present invention over those heretofor known in the art.

The edge stability of the polyurethane interlayers of the present invention may be improved by treating the glass and/or the interlayer material with any of the conventional silane adhesion promotors. These materials which are also known as sizing agents or coupling agents include gamma-glycidyloxypropyltrimethoxysilane, N-trimethoxysilyl propyl ethylene diamine, etc. Optionally, one may treat the surface of the interlayer and/or the glass with an epoxy resin. Alternately, one may mix the silane and/or the epoxy resin with the polyurethane interlayer material. Care must be taken in the selection of the type and amount of materials so as not to introduce color into the interlayer.

As stated above, the polyurethane interlayers of the present invention are also useful as the interlayer component in laminated glazing units wherein pellucid synthetic resin sheets are used in place of glass sheet. Examples of such pellucid sheets would include polystyrene, polyvinyl chloride, polycarbonate, polymethylmethacrylate, poly(acrylonitrile-styrene), poly(acrylonitrile-butadiene-styrene), etc. Also contemplated are multiple ply laminates such as a glass/polyurethane interlayer/polycarbonate sheet/polyurethane interlayer/glass laminate and a glass/polyurethane interlayer/pellucid synthetic resin sheet laminate.

The present invention also contemplates the use of adjuncts and additives commonly used in interlayer material for glass laminates. These include antioxidants, thermal stabilizers, ultraviolet light stabilizers, dyes, pigments, plasticizers, as well as additives for controlling the amount of adhesion of the interlayer to the glass.

It is obvious that many variations may be made in the products and processes set forth above without departing from the spirit and scope of this invention.

What is claimed is:

1. A polyurethane interlayer for laminated safety glass consisting essentially of the polymerization reaction product of (1) a diisocyanate which is an isomeric mixture of 4,4'-methylenebis(cyclohexylisocyanate); (2) a hydroxy terminated polyester having a melting point above 42°C. and a molecular weight in the range of from 800 to 1200 which is selected from the group consisting of poly(1,4-butylene adipate) and poly(ethylene adipate); and (3) a chain extender which is a diol-containing from 2 to 16 carbon atoms; which is selected from the group consisting of aliphatic and alicyclic diols; wherein the diisocyanate isomeric mixture has a trans-trans content of from 0 to 30 percent by weight, a cis-cis content of from 0 to 25 percent by weight and a cis-trans content of from 45 to 90 percent by weight and wherein the ratio of diisocyanate/polyester/chain extender in the polyurethane interlayer is in the range of from 1.5/1.0/0.5 to 4/1.0/3.0.

2. The interlayer of claim 1 wherein the polyester is poly(1,4-butylene adipate).

3. The interlayer of claim 1 wherein the polyester is poly(ethylene adipate).

4. The interlayer of claim 1 wherein the chain extender is selected from the group consisting of 1,3-propane diol and 1,5-pentane diol.

5. The interlayer of claim 1 wherein the diisocyanate isomeric mixture has a trans-trans content of from 15 to 25 percent by weight, a cis-cis content of from 10 to 20 percent by weight and a cis-trans content of from 55 to 75 percent by weight.

6. The interlayer of claim 1 wherein the ratio of diisocyanate/polyester/chain extender in the polyurethane interlayer is in the range of from 2.0/1.0/0.94 to 2.3/1.0/1.23.

7. A polyurethane interlayer for laminated safety glass consisting essentially of the polymerization reaction product of (1) a diisocyanate which is an isomeric mixture of 4,4'-methylenebis-(cyclohexylisocyanate); (2) a hydroxy terminated polyester having a melting point above 42°C. and a molecular weight in the range of from 800 to 1200 which is selected from the group consisting of poly(1,4-butylene adipate) and poly(ethylene adipate); and (3) a chain extender which is a linear aliphatic alpha-, omega-diol containing from 2 to 16 carbon atoms; wherein the diisocyanate isomeric mixture has a trans-trans content of from 15 to 25 percent by weight, a cis-cis content of from 10 to 20 percent by weight and a cis-trans content of from 55 to 75 percent by weight; and wherein the ratio of diisocyanate/polyester/chain extender in the polyurethane interlayer is in the range of from 2.0/1.0/0.94 to 2.3/1.0/1.23.

8. The interlayer of claim 7 wherein the polyester is selected from the group consisting of poly(1,4-butylene adipate) and poly(ethylene adipate) having molecular weights in the range of from 800 to 1200.

9. The interlayer of claim 7 wherein the chain extender is selected from the group consisting of 1,3-propane diol and 1,5-pentane diol.

10. A polyurethane interlayer for laminated safety glass consisting essentially of the polymerization reaction product of (1) a diisocyanate which is an isomeric mixture of 4,4'-methylenebis-(cyclohexylisocyanate); (2) a hydroxy terminated polyester having a melting point above 42°C. and a molecular weight in the range of from 800 to 1200 which is selected from the group consisting of poly(1,4-butylene adipate) and poly(ethylene adipate); and (3) a chain extender which is selected from the group consisting of 1,3-propane diol and 1,5-pentane diol; wherein the diisocyanate isomeric mixture has a trans-trans content of from 18 to 22 percent by weight, a cis-cis content of from 12 to 18 percent by weight and a cis-trans content of from 60 to 70 percent by weight; and wherein the ratio of diisocyanate/polyester/chain extender in the polyurethane interlayer is in the range of from 2.0/1.0/0.94 to 2.3/1.0/1.23.

* * * * *